(12) United States Patent
Daum et al.

(10) Patent No.: US 9,221,480 B2
(45) Date of Patent: Dec. 29, 2015

(54) SYSTEMS AND METHODS FOR IDENTIFYING DIFFERENT TYPES OF TRACTION MOTORS IN A VEHICLE SYSTEM

(71) Applicant: General Electric Company, Schenectady, NY (US)

(72) Inventors: Wolfgang Daum, Erie, PA (US); Ajith Kuttannair Kumar, Erie, PA (US)

(73) Assignee: General Electric Company, Schenectady, NY (US)

( * ) Notice: Subject to any disclaimer, the term of this patent is extended or adjusted under 35 U.S.C. 154(b) by 84 days.

(21) Appl. No.: 14/150,798

(22) Filed: Jan. 9, 2014

(65) Prior Publication Data

US 2015/0191183 A1 Jul. 9, 2015

(51) Int. Cl.
*G05D 1/00* (2006.01)
*B61L 15/00* (2006.01)
*B61C 17/12* (2006.01)

(52) U.S. Cl.
CPC ............. *B61L 15/0081* (2013.01); *B61C 17/12* (2013.01)

(58) Field of Classification Search
None
See application file for complete search history.

(56) References Cited

U.S. PATENT DOCUMENTS

| | | | |
|---|---|---|---|
| 2,413,190 A * | 12/1946 | Ogden ........................... | 318/248 |
| 3,737,745 A * | 6/1973 | Chevaugeon et al. .......... | 318/52 |
| 5,456,604 A | 10/1995 | Olmsted et al. | |
| 5,501,416 A * | 3/1996 | Capan .......................... | 246/63 R |
| 5,585,717 A | 12/1996 | Eriksson et al. | |
| 5,629,870 A | 5/1997 | Farag et al. | |
| 6,262,550 B1 | 7/2001 | Kliman et al. | |
| 6,297,742 B1 | 10/2001 | Canada et al. | |
| 6,393,373 B1 | 5/2002 | Duyar et al. | |
| 6,903,525 B2 | 6/2005 | Carson et al. | |
| 6,920,413 B2 | 7/2005 | Sumida et al. | |
| 7,127,373 B2 | 10/2006 | House et al. | |
| 7,135,830 B2 | 11/2006 | El-Ibiary | |
| 7,171,372 B2 | 1/2007 | Daniel et al. | |
| 7,184,902 B2 | 2/2007 | El-Ibiary | |
| 7,406,399 B2 | 7/2008 | Furem et al. | |
| 7,557,528 B2 | 7/2009 | Kumar et al. | |
| 8,203,298 B2 | 6/2012 | Lu et al. | |
| 2002/0022984 A1 | 2/2002 | Daniel et al. | |
| 2006/0061307 A1* | 3/2006 | Donnelly ...................... | 318/108 |
| 2007/0213160 A1* | 9/2007 | Lyons et al. ...................... | 475/5 |
| 2008/0074070 A1* | 3/2008 | Kumar et al. .................. | 318/561 |
| 2008/0201028 A1* | 8/2008 | Brooks et al. .................... | 701/20 |
| 2009/0248226 A1* | 10/2009 | Kellner et al. ................... | 701/19 |
| 2011/0012422 A1* | 1/2011 | Neher ............................. | 307/9.1 |
| 2011/0050142 A1 | 3/2011 | Lu et al. | |
| 2012/0160125 A1* | 6/2012 | Liberatore et al. .............. | 105/61 |
| 2013/0013138 A1* | 1/2013 | Lu et al. ........................... | 701/22 |
| 2013/0079959 A1* | 3/2013 | Swanson et al. ................ | 701/19 |
| 2013/0261842 A1* | 10/2013 | Cooper et al. ..................... | 701/1 |

FOREIGN PATENT DOCUMENTS

RU 2428326 C1 * 9/2011 ................ B60L 3/10

* cited by examiner

*Primary Examiner* — Calvin Cheung
(74) *Attorney, Agent, or Firm* — GE Global Patent Operation; John A. Kramer

(57) ABSTRACT

A control system including a measurement module configured to receive motor measurements that represent operating parameters of plural traction motors of a common vehicle system as the vehicle system propels along a route. The control system also includes an analysis module configured to compare the motor measurements to an expected measurement. The expected measurement corresponds to a designated motor type. The analysis module is configured to determine that at least one of the traction motors is different from the designated motor type based on comparing the motor measurements to the expected measurement.

20 Claims, 6 Drawing Sheets

SYSTEMS AND METHODS FOR IDENTIFYING DIFFERENT TYPES OF TRACTION MOTORS IN A VEHICLE SYSTEM

BACKGROUND

Embodiments of the subject matter described herein relate to systems and methods for determining operating parameters for traction motors in a vehicle system.

At least some known vehicle systems have propulsion systems that include multiple traction motors. The traction motors are operated as a group to collectively propel the vehicle system along a route. For instance, various propulsion systems have been developed for locomotives. In one type of propulsion system, the fraction motors are individually controlled to propel the locomotive along the designated route. Each of the traction motors may be energized by a separate inverter that is individually controlled to adjust an excitation frequency of the respective traction motor. The excitation frequency controls the rotation of the traction motor, which drives a corresponding axle that is coupled to a wheel of the locomotive. Although each of the traction motors can be controlled individually, the propulsion system coordinates operation of the traction motors to achieve a total tractive effort for the locomotive. This type of propulsion system may be referred to as a "per-axle" system, because each axle is driven by an individually-controlled traction motor.

In another type of propulsion system, a set of traction motors are supported by a common truck. The traction motors of the truck may be in parallel or in series and energized by a common inverter. As such, each of the traction motors receives the same excitation frequency from the inverter. Assuming that each of the traction motors is of the same motor type (e.g., designed to provide the same motor performance) and the wheel diameters are equal, the traction motors supply an equal amount of tractive effort because the traction motors receive the same excitation frequency. Locomotives having this type of propulsion system typically include two trucks. This type of propulsion system is referred to as a "per-truck" system, because the multiple traction motors of the truck are controlled by a single inverter.

In many cases, the traction motors for one type of propulsion system are designed to provide a designated motor performance, which may differ from the motor performances of other propulsion systems. By way of example, in per-truck systems, it is generally desirable to have traction motors with high resistance rotors. The overall performance of a per-truck system can be sensitive to differences in wheel diameters. Although the traction motors receive the same excitation frequency, the traction motors will provide different amounts of torque if the wheel diameters of the wheels that are coupled to the traction motors are unequal. This may lead to undesirable motor heating, motor losses, and/or reduced performance. Traction motors having high resistance rotors are used in per-truck systems because such traction motors reduce the sensitivity of the propulsion system to unequal wheel diameters. Although per-axle systems may also have wheels with different diameters, the per-axle systems are capable of individually controlling the axles to reduce the negative effects of the unequal wheel diameters. With the sensitivity to unequal wheel diameters being less of a concern, traction motors in per-axle systems are permitted to use low resistance rotors, which can be more efficient than high resistance rotors.

In the past, railroads typically used locomotives having the same type of propulsion system and, consequently, the same type of traction motor. Recently, however, railroads have begun to use different types of propulsion systems. During the lifetime operation of a locomotive, the traction motors of the propulsion system may be replaced. It may be possible that the traction motor configured for one type of propulsion system will be installed into a propulsion system of another type. If this occurs, it may not be readily apparent to the operator or the control system of the locomotive that the traction motor is unsuitable. Nevertheless, continued operation of the locomotive with the improper fraction motor may compromise the overall performance of the propulsion system, increase a likelihood of motor failure, or cause other unwanted effects to the fraction motor or the propulsion system.

BRIEF DESCRIPTION

In an embodiment, a control system is provided that includes a measurement module configured to receive motor measurements that represent operating parameters of plural traction motors of a common vehicle system as the vehicle system propels along a route. The traction motors may be energized by a common power source and be electrically parallel with respect to one another. The control system also includes an analysis module configured to compare the motor measurements to an expected measurement. The expected measurement corresponds to a designated motor type. The analysis module is configured to determine that at least one of the traction motors is different from the designated motor type based on comparing the motor measurements to the expected measurement.

In an embodiment, a method is provided that includes controlling plural traction motors of a vehicle system to propel the vehicle system along a route. The traction motors may be energized by a common power source and be electrically parallel with respect to one another. The method also includes receiving motor measurements that represent operating parameters of the traction motors as the vehicle system propels along the route. The method also includes comparing the motor measurements to an expected measurement. The expected measurement corresponds to a designated motor type. The method also includes determining that at least one of the traction motors is different from the designated motor type based on comparing the motor measurements to the expected measurement.

In an embodiment, a control system is provided that includes a measurement module configured to receive motor measurements that represent operating parameters in plural traction motors of a common vehicle system as the vehicle system propels along a route. The traction motors may be energized by a common power source and be electrically parallel with respect to one another. The control system also includes an analysis module that is configured to compare the motor measurements to one another. The analysis module is configured to determine that the traction motors include different motor types based on comparing the motor measurements to one another.

In an embodiment, a method is provided that includes controlling plural traction motors of a vehicle system to propel the vehicle system along a route. The traction motors may be energized by a common power source and be electrically parallel with respect to one another. The method also includes receiving motor measurements that represent operating parameters of the traction motors as the vehicle system propels along the route. The method also includes comparing the motor measurements to one another to determine whether the traction motors include different motor types.

In an embodiment, a control system is provided that includes a measurement module configured to receive motor measurements that represent operating parameters in plural traction motors of a common vehicle system as the vehicle system propels along a route. The traction motors may be energized by a common power source and be electrically parallel with respect to one another. The control system also includes an analysis module configured to calculate a performance relationship of the operating parameters for each of the traction motors based on the motor measurements. The analysis module is configured to determine that the traction motors include different motor types based on the performance relationships for each of the traction motors.

In an embodiment, a method is provided that includes controlling plural traction motors of a vehicle system to propel the vehicle system along a route. The traction motors include different motor types. The method also includes receiving motor measurements that represent operating parameters of the traction motors as the vehicle system propels along a route and calculating a performance relationship of the operating parameters for each of the traction motors based on the motor measurements. The method also includes determining that the traction motors include the motor types are different based on the performance relationships for each of the traction motors.

In various aspects, in response to determining that the motor types of the traction motors are different or that at least one of the traction motors is different from a designated motor type, the systems and methods set forth herein may be configured to at least one of (a) notify an operator of the vehicle system of the at least one different motor type; (b) notify a remote monitoring station of the at least one different motor type; (c) reduce tractive efforts of the at least one different motor type; or (d) instruct a planning module to modify a current operating plan of the vehicle system based on the at least one different motor type.

DETAILED DESCRIPTION

Figure 1:
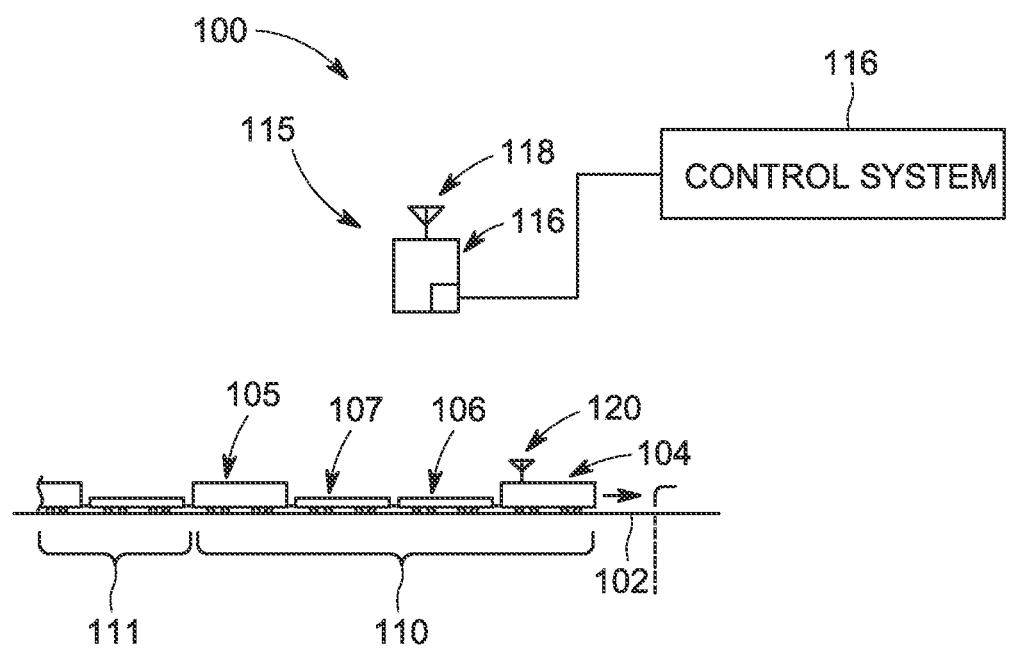
FIG. 1 is a schematic diagram of an embodiment of a vehicle system traveling along a route.

Embodiments of the inventive subject matter described herein include methods and systems for determining that one or more fraction motors of a vehicle system are unsuitable for the desired operation of the vehicle system or are not the same type as the other traction motors. Such vehicle systems may include at least one propulsion-generating vehicle having plural fraction motors for generating tractive efforts of the vehicle system. In some cases, traction motors may also be used as generators during braking efforts. During operation of the vehicle system, motor measurements may be obtained that represent operating parameters of the traction motors. The operating parameters relate to motor performance. Non-limiting examples of operating parameters for a traction motor that may be utilized by embodiments described herein include a motor speed (e.g., rotation rate of the rotor of the traction motor), a motor slip, a wheel speed, a wheel creep, an excitation frequency of the current that is supplied to the traction motor, a voltage supplied to the traction motor, a current supplied to the fraction motor, a motor current within a rotor of the traction motor (e.g., induced current), a torque of the traction motor, a horsepower of the traction motor, diameters of the axles or wheels coupled to the traction motor, an impedance of the traction motor, and a reactance of the traction motor.

The motor measurements may be values of the operating parameters and may be detected directly from the vehicle system or calculated based on other measurements. For example, torque and horsepower may be calculated in different manners from a variety of measurements. The motor measurements associated with a first traction motor may also be detected by deactivating the first traction motor and measuring a change in performance by other traction motors of the vehicle system. The change in performance of the other traction motors may be indicative of the motor performance of the first traction motor.

Based on these motor measurements, systems and methods set forth herein may determine that one or more of the traction motors is improper or incorrect for the desired operation of the vehicle system or that a group of traction motors are mismatched. Embodiments may make this determination by comparing the motor measurements to one or more expected measurements or metrics. The motor measurements that the determination is based on may be a single type of motor measurement (e.g., excitation frequency) or multiple types of motor measurements (e.g., excitation frequency and torque). It is understood that a variety of types of measurements may be used, such as power measurements, heat measurements, tractive effort measurements, voltage and current measurements, acceleration versus effort measurements, and the like.

The expected measurements or metrics may correspond to a designated motor type. More specifically, the expected measurement may represent the motor measurement that should be received if the motor-of-interest (e.g., one or more of the traction motors of the vehicle system) was of the designated motor type. The expected measurement may be a function of the operating conditions that the traction motors are currently operating within. For instance, the expected measurement may be a function of at least one of the excitation frequency, load of the vehicle system, an apportioned load for the motor-of-interest, operating temperature of the traction motor, other operating parameters described herein, or external factors, such as weather conditions or a friction coefficient of the route. The expected measurement may be a range of values, a baseline value, or a threshold value. In some cases, the expected measurement or metric may be a performance relationship (e.g., function) of multiple operating parameters. For example, a relationship between motor speed and torque or between motor speed and current may be determined. In such instances, the expected metric may be a shape that corresponds to a portion of a relationship curve between the operating parameters, which is described in greater detail below.

Embodiments may also determine that one or more of the traction motors is unsuitable or does not match the other traction motors by comparing the motor measurements of one traction motor to the motor measurements of the other traction motors. As a specific example, traction motors on a common truck or propulsion-generating vehicle may be energized by a common power source (e.g., inverter) and receive the same excitation frequency. In this case, the motor measurements may be expected to be approximately equal to each other. After comparing the motor measurements of the different traction motors, it may be determined that one of the traction motors is operating in a significantly different manner such that there is a high confidence that the traction motor is a different type of motor than the other traction motors. For instance, traction motors of the same type may have motor measurements that are within a designated range or percentage of each other.

Traction motors that have unexpected motor measurements may be identified as unsuitable traction motors for the designated operation. In some embodiments, traction motors may be identified or labeled as being mismatched. For example, if one or more of the motor types of the traction motors is incorrect or is not the expected motor type, the traction motors may be mismatched. In response to detecting the unsuitable or mismatched traction motor(s), embodiments may, for example, modify operation of the vehicle system, generate a plan for having the unsuitable traction motor replaced, and/or notify an operator or control system so that the operator or control system is aware or so that the operator or control system initiates a designated action for addressing the unsuitable motor(s). In some embodiments, operation of the vehicle system may be modified by cutting out or disconnecting the unsuitable fraction motor (e.g., disconnecting contactors that supply power to the traction motors). The operation may also be modified by reducing operation of the unsuitable traction motor (e.g., reducing torque and/or motor speed). Operation of the vehicle system may also be modified by changing an operating point, such as decreasing or increasing flux.

In some embodiments, one or more of the propulsion-generating vehicles may include powered wheelsets. Each of the wheelsets may have a wheel that is coupled to an axle that is driven by a traction motor. Propulsion systems (or the corresponding propulsion-generating vehicle) that have multiple wheelsets controlled by a common inverter may be referred to as per-truck systems (or per-truck vehicles). Propulsion systems (or the corresponding propulsion-generating vehicle) that have multiple wheelsets in which each wheelset is controlled by a separate inverter may be referred to as per-axle systems (or per-axle vehicles).

Propulsion systems may be configured to operate with a designated type of traction motor. Traction motors of a particular motor type may be configured to have designated motor characteristics. More specifically, the various components of the traction motors, such as the structure of the stator, rotor, and windings, may be designed to achieve a designated performance. A composition of the stator, rotor, and windings, such as a ratio of copper to iron, may also be configured to achieve a designated performance.

In certain embodiments, the traction motors of different types may have different performance relationships among the operating parameters. In some embodiments, the different performance relationships may be identified upon analysis of the traction motors during operation. For instance, different motor types may have different torque-speed functions, current-speed functions, torque-slip functions, current-slip functions, and the like. Each of these functions may have identifiable features or portions that are indicative of the motor type. As a specific example, the above functions may be substantially linear when the motor speed is proximate to the synchronous speed of the traction motor. The slope of these linear portions, however, may differ based on the motor type.

Although traction motors of the same type may have variations in performance due to manufacturing tolerances and operational wear of the traction motors, such variations may be insubstantial compared to the differences in performance of different types of traction motors. For instance, traction motors may be designed to provide a designated motor speed as a function of expected load or motor slip or may be designed to provide a designated starting torque, pull-up torque, breakdown torque, or full-load torque. As such, traction motors of a motor type that is designed for particular applications may provide measurements or have performance relationships that distinguish this motor type from other motor types. By way of example, locomotives that frequently travel along steep routes may have traction motors that are configured differently than locomotives that frequently travel along flat routes. Locomotives configured to carry large loads (e.g., coal) may be configured for high-weight, low-speed applications. Locomotives configured for lighter loads (e.g., passengers) may be configured for low-weight, high-speed applications.

As another example, per-axle systems may be configured to have traction motors with low resistance rotors and per-truck systems may be configured to have high resistance rotors. Per-axle vehicles include the AC Series and Evolution Series developed by General Electric. Per-truck vehicles include the Electro-Motive Diesel (EMD) developed by General Motors. Embodiments set forth herein may be configured to identify fraction motors having low resistance rotors among fraction motors having high resistance rotors and vice versa. For example, a torque-slip characteristic may be calculated for each traction motor during operation of a vehicle system. The traction motor(s) configured for per-axle systems will have a different torque-slip characteristic for the traction motor(s) configured for per-truck systems.

A vehicle system may include multiple propulsion-generating vehicles. In such instances, the multiple propulsion-generating vehicles may be arranged to form a single vehicle consist or a plurality of vehicle consists. In some embodiments, the propulsion-generating vehicles of a single vehicle consist are configured to communicate with each other to coordinate tractive efforts and/or braking efforts. Vehicle systems may also include multiple vehicle consists. In some cases, the vehicle consists may communicate with one another. As one specific example, a train may include first, second, and third locomotive consists, wherein each of the locomotive consists includes two locomotives. The locomotive consists may receive instructions from a control system for controlling operations of the two locomotives.

In some embodiments, the motor measurements are acquired during normal operation of the vehicle system. For example, the motor measurements may be acquired without deviating from an operating plan or without deviating from inputs or instructions from an operator (e.g., engineer). An operating plan, which may also be referred to as a trip plan or mission plan, may include instructions for controlling the propulsion-generating vehicles to provide designated tractive efforts and/or designated braking efforts for predetermined portions of a trip. The instructions may be expressed as a function of time and/or distance of a trip along a route. In some embodiments, upon detecting that the traction motors are mismatched or that one or more fraction motors are unsuitable for the desired operation, the systems and methods described herein may modify the operating plan based on the unsuitable traction motor. For example, the operating plan may instruct the propulsion system that includes the unsuitable fraction motor to reduce tractive efforts by half.

FIG. 1 is a schematic diagram of a vehicle system 100 formed in accordance with an embodiment. In the illustrated embodiment, the vehicle system 100 is a rail vehicle system. While the description herein refers specifically to rail vehicles, such as locomotives, not all embodiments are so limited. The inventive subject matter described herein may be used in connection with one or more other vehicles or vehicle systems, such as automobiles for traveling along roads, off-highway vehicles, construction or farming equipment, and marine vessels.

As shown, the vehicle system 100 is traveling along a portion of a route or track 102. The vehicle system 100 includes a plurality of discrete vehicles. As used herein, "discrete" vehicles are separate and distinct vehicles that are capable of being removably coupled to and part of a larger vehicle system. The vehicle system 100 may be a rail vehicle system that includes at least one propulsion-generating vehicle (e.g., locomotive) and, optionally, at least one non-powered vehicle (e.g., rail car or passenger car) that are linked to one another.

In the illustrated embodiment, the vehicle system 100 includes propulsion-generating vehicles 104 and 105 and non-powered vehicles 106 and 107 that are mechanically linked to one another and are configured to travel as a group along the track 102. The terms "powered" or "propulsion-generating" refer to the capability of a vehicle to propel itself and not whether the vehicle receives or generates energy for one or more other purposes. For example, the non-powered vehicles 106, 107 may receive electric current to power one or more loads disposed onboard the non-powered vehicles 106, 107 (e.g., air conditioning, lighting, etc.).

In FIG. 1, the propulsion-generating vehicle 104 may be considered a principal or lead vehicle of a vehicle consist 110, and the propulsion-generating vehicle 105 may be considered a remote vehicle of the vehicle consist 110. A propulsion-generating vehicle that controls one or more other propulsion-generating vehicles may be referred to as the "principal" or "lead" propulsion-generating vehicle, and propulsion-generating vehicles that are controlled by another propulsion-generating vehicle may be referred to as the "remote" propulsion-generating vehicles. The principal propulsion-generating vehicle may or may not lead other vehicles along the route. The plurality of propulsion-generating vehicles 104, 105 in the single vehicle consist 110 are configured to operate as a single moving apparatus. For example, the multiple propulsion-generating vehicles 104, 105 may coordinate tractive efforts and/or braking efforts to propel the vehicle system 100 along the track 102.

A vehicle system may be or include a single vehicle consist or include a plurality of vehicle consists that are directly or indirectly coupled to another. For example, the vehicle system 100 includes a second vehicle consist 111 that is coupled to the vehicle consist 110. When a vehicle system includes multiple vehicle consists, the vehicle consists may be referred to as sub-consists. If the vehicle system includes multiple vehicle consists, the vehicle consists may be configured to operate as a single moving apparatus. For example, the multiple vehicle sub-consists may be controlled by a master computing system that coordinates tractive and/or braking efforts among the sub-consists to control operation of the vehicle system as a whole. The master control system may also be configured to acquire motor measurements as described herein.

Also shown in FIG. 1, the vehicle system 100 may communicate with an off-board control system 116 that can be disposed off-board (e.g., outside) of the vehicle system 100. For example, the control system 116 may be disposed at a central dispatch office 115 for a railroad company. The control system 116 can generate and communicate various operating plans and/or communicate information regarding track conditions. The control system 116 may also include one or more modules for receiving and analyzing the motor measurements acquired by the vehicle system 100. The control system 116 can include a wireless antenna 118 (and associated transceiving equipment), such as a radio frequency (RF) or cellular antenna, that wirelessly transmits signals to the vehicle system 100. The vehicle system 100 may also include a wireless antenna 120 (and associated transceiving equipment). In some embodiments, the control system 116 may be configured to determine that one or more traction motors are unsuitable for the desired operation of the vehicle system 100 or that the traction motors are mismatched. For example, the control system 116 may include similar modules as the control system 206 (shown in FIG. 2) described below.

Figure 2:
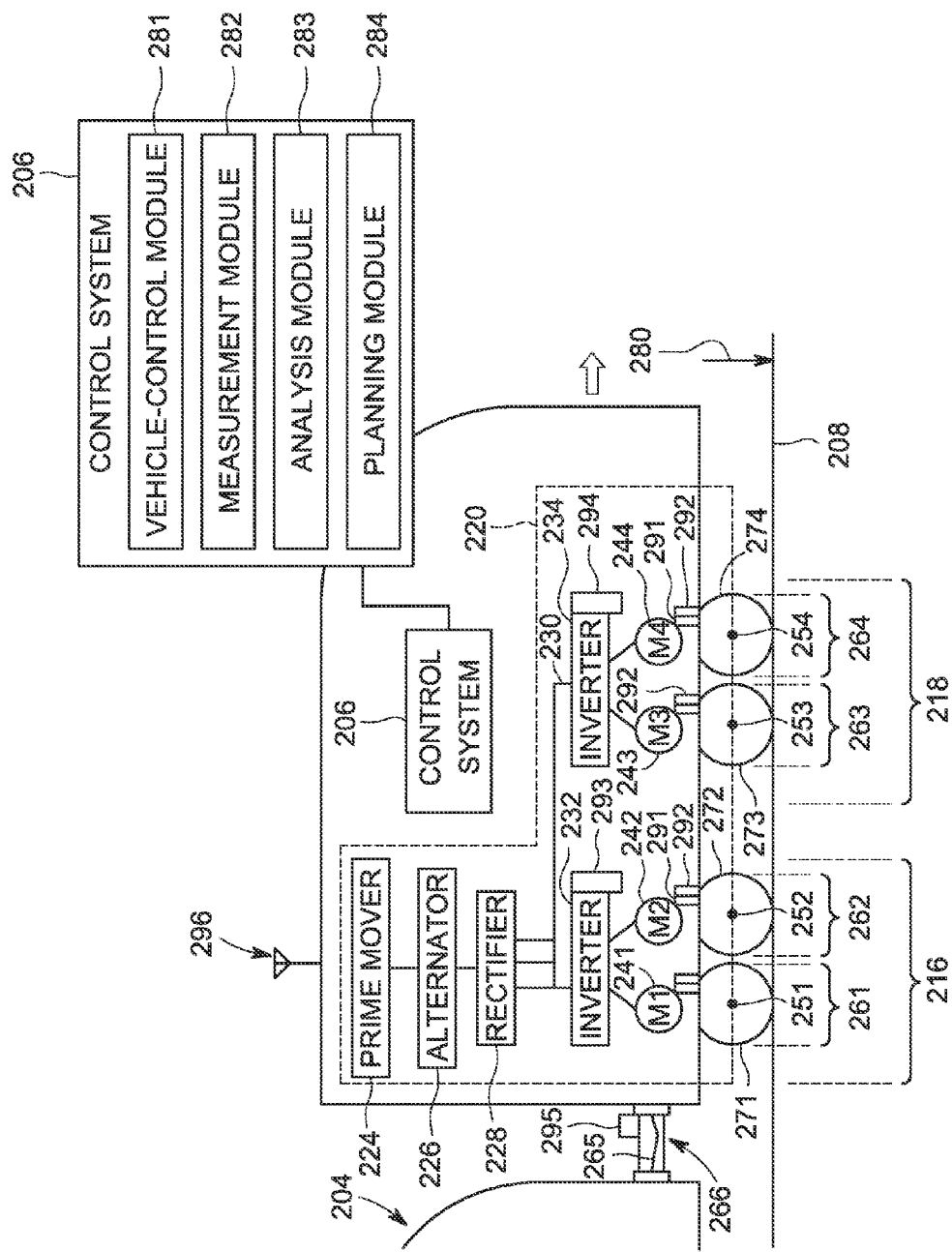
FIG. 2 is a schematic diagram of a propulsion-generating vehicle that may be used with the vehicle system of FIG. 1.

FIG. 2 is a schematic diagram of a propulsion-generating vehicle 200, which may be part of a rail vehicle system 200, such as the vehicle system 100 (FIG. 1). The propulsion-generating vehicle 200 may constitute or be part of a vehicle consist that may or may not be coupled with other vehicle consist(s) (not shown) in the rail vehicle system. As shown, the propulsion-generating vehicle 200 includes a control system 206 that is configured to control operation of the propulsion-generating vehicle 200 and, optionally, other propulsion-generating vehicles of the vehicle system that includes the propulsion-generating vehicle 200. Alternatively, the control system 206 may be distributed between the propulsion-generating vehicles. For embodiments that include multiple vehicle consists, the control system 206 may be configured to control operation of other vehicle consists.

The propulsion system 220 can include a variable speed prime mover or engine 224 that is mechanically coupled to a rotor of a dynamo electric machine. In the illustrated embodiment, the dynamo electric machine is an alternator 226 and, in particular, a 3-phase alternating current (AC) synchronous alternator. The 3-phase voltages generated by the alternator 226 are supplied to input terminals of a power rectifier bridge 228. The rectifier bridge 228 may transform or modify the AC power from the alternator 226 into direct current (DC) power. The power rectifier bridge 228 has output terminals that supply the DC power to a DC link or bus 230. Although the propulsion system 220 is described as being an AC-type propulsion system that is powered by diesel, it is understood that embodiments set forth herein may also be implemented with propulsion systems that are at least partially powered by electricity (e.g., batteries, catenary system, and the like).

As shown, the DC link 230 is electrically connected to inverters 232, 234. The inverters 232, 234 are configured to convert (e.g., invert) the DC power into AC power at a controlled frequency for powering traction motors 241-244. The inverters 232, 234 may employ high power gate turn-off devices which switch in and out of conduction in response to gating signals from the control system 206 (or the vehicle-control module 210) so as to invert the DC voltage on the DC link 230 to a controlled frequency AC voltage.

The traction motors 241, 242 are electrically connected to and powered by the inverter 232, and the traction motors 243, 244 are electrically connected to and powered by the inverter 234. The traction motors 241, 242 are electrically parallel to each other, and the traction motors 243, 244 are electrically parallel to each other. Electrically parallel traction motors may receive the same excitation frequency from the corresponding inverter. In alternative embodiments, the traction motors 241, 242 and/or the traction motors 243, 244 may be in series. Other embodiments may include a combination of traction motors that are in series and in parallel. In some embodiments, the traction motors 241-244 are adjustable speed AC traction motors (e.g., induction motors). Also shown, the motors 241-244 are operably coupled to axles 251-254, respectively, that are each coupled to wheels 271-274. The motors 241-244, the axles 251-254, and the wheels 271-274 may constitute respective axle wheelsets 261-264. For example, the traction motor 241, the axle 251, and a pair of wheels 271 may constitute the wheelset 261, which is configured to generate a tractive effort for propelling the propulsion-generating vehicle 200 and, hence, the rail vehicle system 200. Each of the axle wheelsets 261-264 may be selectively controlled the control system 206 to provide a designated tractive effort or braking effort.

In the illustrated embodiment, the propulsion system 220 is a per-truck system having two separate trucks 216, 218. For example, each of the inverters 232, 234 controls a pair of traction motors that are electrically parallel. In other embodiments, the inverters 232, 234 may control more than two traction motors (e.g., three or four). The inverter 232 and the traction motors 241, 242 may be part of or constitute a first truck 216. The inverter 234 and the fraction motors 243, 244 may be part of or constitute a second truck 218. Each of the trucks 216, 218 may be secured to a frame of the propulsion-generating vehicle 200.

In other embodiments, the propulsion system 220 may be a per-axle system in which each of the traction motors 241-244 is controlled by a single inverter that is configured to exclusively control the respective traction motor. Such embodiments may enable individual control of the traction motors.

Although the illustrated embodiment shows a 4-axle propulsion system, it is understood that the inventive subject matter described herein is not limited to 4-axle systems and is equally applicable to other systems. For example, the propulsion system 220 may be a 6-axle locomotive with two inverters that are each connected for powering three traction motors. Alternatively, the propulsion system 220 may be a 6-axle locomotive with six inverters each connected for powering a respective one of six traction motors.

In the illustrated embodiment, the propulsion-generating vehicle 200 and an adjacent rail vehicle 204 are directly connected by a mechanical coupler 266. The rail vehicle 204 may be another propulsion-generating vehicle or may be a non-powered vehicle. The mechanical coupler 266 may allow some tolerance or slack such that the propulsion-generating vehicle 200 and the rail vehicle 204 are permitted to move a limited distance toward each other or away from each other. The coupler 266 may permit a communication cable 265 to extend between and communicatively couple the vehicles 200, 204.

The rail vehicle system 200 travels along a route 208, such as a track having one or more rails. The propulsion-generating vehicle 200 facilitates driving the vehicle system 200 using the wheelsets of the vehicle. For example, the fraction motors 241-244 deliver torque to the wheels 271-274, which exert tangential force (e.g., tractive effort) along the route 208, thereby propelling the rail vehicle system 200 along the route 208. The tractive effort developed at each wheel of the propulsion-generating vehicle 200 is proportional to a normal force 280 acting on the respective wheel.

For a dynamic braking mode, the traction motors 241-244 are reconfigured (via power switching devices (not shown)) so that the fraction motors 241-244 operate as generators. So configured, the traction motors 241-244 generate electric energy which has the effect of slowing the propulsion-generating vehicle 200. In some cases, energy generated in a dynamic braking mode may be transferred to resistance grids (not shown) that are coupled to the propulsion-generating vehicle 200. The dynamic braking energy may be converted to heat and dissipated from the propulsion-generating vehicle 200 through the grids. In other embodiments, the dynamic braking energy may be stored (e.g., batteries) by the propulsion-generating vehicle 200.

Also shown in FIG. 2, the rail vehicle system 200 may include a number of detection devices 291-295. The detection devices 291-295 of the control system 206 may be located at various points in the propulsion-generating system 200. For example, the detection devices 293, 294 are coupled to the inverters 232, 234, respectively. The detection devices 291, 292 are coupled to each of the traction motors 241-244. The detection devices 291-295 are configured to monitor one or more operating parameters of the traction motors 241-245. More specifically, the detection devices 291-295 may obtain measurements relating to the operating parameters to determine a performance relationship of the fraction motors 241-245. In some embodiments, the detection devices 291-295 are configured to detect a motor measurement or other measurements that may be used to calculate a motor measurement. Motor measurements may include excitation frequency of the current, a supply voltage, a motor current (e.g., induced current), a torque or horsepower, a motor speed or rotation rate of the rotor, axle or wheel diameters of the traction motor, a motor slip, impedance of the traction motor, or reactance of the traction motor. In some embodiments, the detection devices 291-295 may also be configured to detect torsional vibrations, vehicle speed (e.g., ground speed), wheel strain, axle strain, or dog-bone strain.

The detection device 295 may be operably connected to the mechanical coupler 266 and configured to detect stresses or forces sustained at the mechanical coupler 266. In some embodiments, the data obtained by the detection device 295 may be used to calculate the measurements used to determine torque or horsepower. In some embodiments, the detection devices may include a radar system (e.g., Doppler radar gun or other type of radar system) or a Global Positioning System (GPS) system that is used to obtain the data representative of the speed at which the propulsion-generating vehicle 200 moves along the route 208.

The control system 206 is configured to control at least some operations of the propulsion-generating vehicle 200. In some embodiments, the control system 206 may also control operations of other vehicles. For instance, the control system 206 may be a master control system configured to control operation of multiple vehicles within a consist or to control operation of multiple consists. As shown, the control system 206 includes a plurality of modules 281-284. The control system 206 and the corresponding modules 281-284 may be controllers, processors, or other logic-based devices that perform operations based on one or more sets of instructions (e.g., software). In some cases, the different modules of the control system 206 are part of the same logic-based device or, alternatively, are distributed within multiple logic-based devices. The instructions on which the control system 206 operates may be stored on a tangible and non-transitory (e.g., not a transient signal) computer readable storage medium, such as a memory. The memory may include one or more computer hard drives, flash drives, RAM, ROM, EEPROM, and the like. Alternatively, one or more of the sets of instructions that direct operations of the control system 206 may be hard-wired into the logic of the control system 206, such as by being hard-wired logic formed in the hardware of the control system 206.

The vehicle-control module 281 is configured to control tractive and/or braking operations of the propulsion-generating vehicle 200. To this end, the vehicle-control module 281 is configured to communicate with a propulsion system 220 and a braking system (not shown). The vehicle-control module 281 may instruct (e.g., communicate signals to one or more components of the propulsion system 220) to increase or decrease power, tractive effort, etc. For example, the instructions may be in accordance with one or more operating plans that designate tractive operations (e.g., notch or throttle settings) and braking operations to be implemented by the propulsion-generating vehicle 200. In an embodiment, the vehicle-control module 281 may autonomously control operations of the propulsion-generating vehicle 200 according to the operating plan.

The measurement module 282 is configured to receive the motor measurements or other data that represent operating parameters of the traction motors 241-244 as the vehicle 200 travels along the route 208. In some embodiments, the measurement module 282 may analyze the measurements received from detection devices, such as the detection devices 291-295, and/or data to determine that the measurements or data is sufficient or trustworthy. The measurement module 212 may package the measurement or data in predetermined format so that the control system 206 and other modules 282-284 may recognize the measurements. In some cases, the measurement module 212 may execute preliminary processing steps. For example, the measurement module 212 may obtain data from the detection devices 291-295 and calculate the motor measurements that will be used to determine whether the traction motors are suitable or whether the traction motors are mismatched.

In some cases, the measurement module 212 may designate the data or motor measurements as operating conditions. The operating conditions may be used to identify an expected measurement for comparing to the motor measurements. For example, the operating conditions may be an excitation frequency and a load of the propulsion-generating vehicle 200. With this information, the measurement module 212 may use one or more databases or functions to identify an expected measurement of a designated motor type or types. In some embodiments, the measurement module 212 may also be configured to calculate a performance relationship among different operating parameters. The performance relationships may be functions that represent a relationship between different operating parameters, such as motor speed, motor current, motor slip, torque, or horsepower. Such performance relationships are illustrated in FIGS. 3-8.

In some embodiments, the measurement module 212 may communicate the measurements or data relating to the measurements to a transmitter 296. The transmitter 296 may be configured to communicate the motor measurements and/or the operating conditions to, for example, the control system 116. As described herein, the control system 116 may be configured to perform the same operations as the control system 206 for determining whether the traction motors are not suitable or are mismatched.

The analysis module 283 is configured to analyze the motor measurements to determine whether one or more of the traction motors is not suitable for the propulsion-generating vehicle 200 or for the vehicle system that includes the propulsion-generating vehicle 200. For example, the analysis module 283 may compare the motor measurements to an expected measurement, may compare the motor measurements of the different traction motors, or may compare the calculated performance relationships of the traction motors. Such operations are described in greater detail below with respect to the method 500.

The planning module 284 is configured to generate an operating plan for controlling operations of the propulsion-generating vehicle 200 or the vehicle system that includes the propulsion-generating vehicle 200. For example, in response to determining that one or more the traction motors is an unsuitable type of motor or are not like other traction motors, the planning module 284 may modify a currently-implemented or existing operating plan. The operating plan may be configured to improve the performance of the propulsion-generating vehicle 200 and/or to limit the performance of the propulsion-generating vehicle 200 to prevent damage or reduce the likelihood of wear and damage.

The operating plan may include instructions for controlling tractive and/or braking efforts of the vehicle. The instructions may be expressed as a function of time and/or distance of a trip along a route. In some embodiments, travel according to the instructions of the operating plan may cause the vehicle to reduce a stress on a fraction motor relative to the stress that would be sustained by the traction motor if the operating plan were not generated. For example, the operating plan may instruct the vehicle to reduce the excitation frequency to a traction motor, to intermittently drive the traction motor, or to disable the traction motor altogether. If the motor-of-interest is a member of a set of traction motors of a per-truck system, the operation plan may instruct the vehicle to reduce the excitation frequency of the set of traction motors, to intermittently drive the set of traction motors, or to disable the set of traction motors. The vehicle may be autonomously controlled according to the operating plan or the instructions of the operating plan may be presented to an operator of the vehicle so that the operator can manually control the vehicle according to the operating plan (also referred to herein as a "coaching mode" of the vehicle).

The planning module 284 may be configured to use at least one of vehicle data or route data (or a route database) to generate the operating plan. The vehicle data may include information on the characteristics of the vehicle. For example, when the vehicle is a rail vehicle, the vehicle data may include a number of rail cars, number of locomotives, information relating to an individual locomotive or a consist of locomotives (e.g., model or type of locomotive, weight, power description, performance of locomotive traction transmission, consumption of engine fuel as a function of output power (or fuel efficiency), cooling characteristics), load of a rail vehicle with effective drag coefficients, vehicle-handling rules (e.g., tractive effort ramp rates, maximum braking effort ramp rates), content of rail cars, lower and/or upper limits on power (throttle) settings, etc. The vehicle data may also include part data regarding the traction motors. For example, if the traction motors are determined to be designated motor types, the planning module 284 may use historical information regarding such motor types in generating the operating plan.

Route data may include information on the route, such as information relating to the geography or topography of various segments along the route (e.g., effective track grade and curvature), speed limits for designated segments of a route, maximum cumulative and/or instantaneous emissions for a designated segment of the route, locations of intersections (e.g., railroad crossings), locations of certain track features (e.g., crests, sags, curves, and super-elevations), locations of mileposts, and locations of grade changes, sidings, depot yards, and fuel stations. The route data, where appropriate, may be a function of distance or correspond to a designated distance of the route. In one embodiment, the planning module 284 includes a software application or system such as the Trip Optimizer™ system developed by General Electric Company.

FIGS. 3-8 include plots or graphs illustrating performance relationships of traction motors. In the illustrated embodiment, the traction motors are induction motors. Similar performance relationships may be determined, however, for other types of traction motors, such as direct-current (DC) motors or alternating current (AC) synchronous motors. In each of the plots, the vertical axis (y-axis) represents torque or motor current and the horizontal axis (x-axis) represents motor speed. Motor speed may be the number of times the rotor rotates in a designated period of time. In FIGS. 3-8, the motor speed is in units of frequency (e.g., Hz), the torque is in units of ft-lbs, and the current is in units of amperes or amps. It is understood, however, that the performance relationships may be calculated with other units. Moreover, similar performance relationships may be calculated with related operating parameters. For example, tractive effort may be substituted for torque and motor slip may be substituted for motor speed. For embodiments in which the traction motors are induction motors, the motor current may be deduced or calculated based on the incoming current, which may be detected by a sensor in some embodiments. Torque may be calculated based on one or more measurements.

Figure 3:
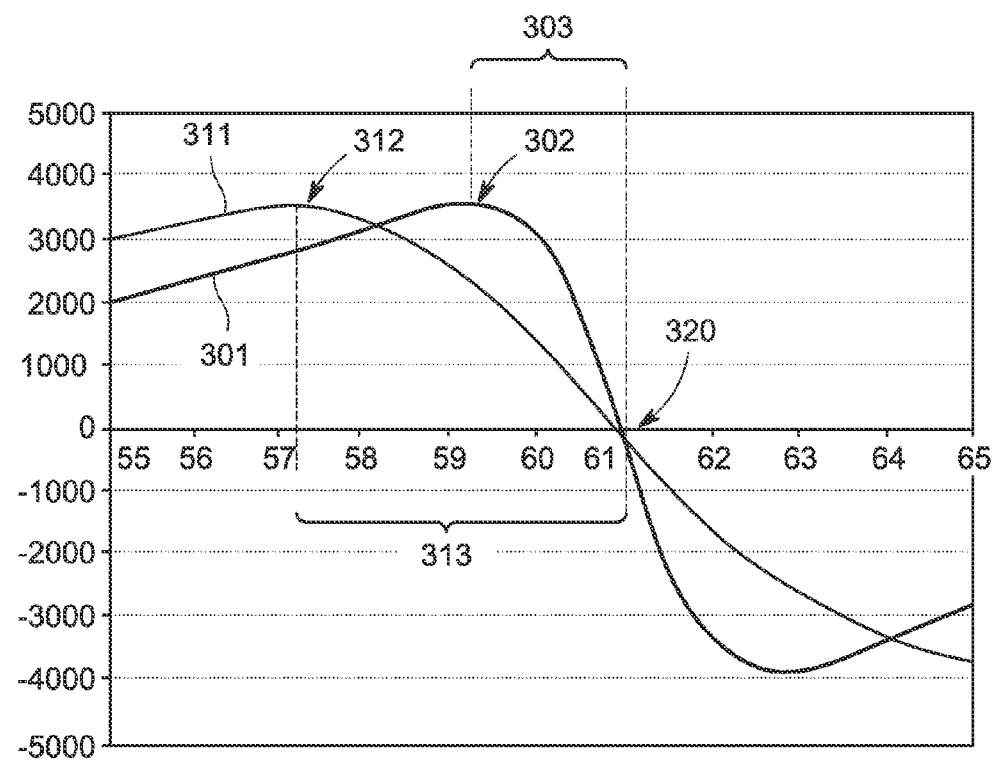
FIG. 3 illustrates torque-speed relationships for different types of traction motors in accordance with an embodiment.

FIG. 3 is a plot representing torque-speed relationships of two different traction motors. Torque is represented by the vertical axis and the motor speed is represented by the horizontal axis. A curve 301 represents the torque-speed relationship of a low-slip traction motor, which may be used by per-axle systems, and a curve 311 represents the torque-speed relationship of a high-slip fraction motor, which may be used by per-truck systems. As described above, the differences in the curves 301, 311 may be based on differences in the structures and/or compositions of the components of the traction motors. In some cases, differences may also exist between traction motors of the same type. Such differences may be based on manufacturing tolerances and/or operating temperatures of the traction motors.

In some embodiments, the operating temperatures of the traction motors may be accounted for in determining whether the traction motors are mismatched. For instance, the shapes of the curves 301, 311 may be functions of the operating temperature of the corresponding traction motor. Performance relationships may be based on the operating temperature of the traction motor. As such, fraction motors of the same type may have portions of the curves 301, 311 with different slopes due to the operating temperatures of the traction motors being different. For example, in some cases, as the operating temperature of the traction motor increases, a substantially linear portion of the curve may become shallower. Accordingly, embodiments may be configured to compensate for different operating temperatures when determining whether different traction motors are of the same or different types.

Embodiments set forth herein may be configured to determine whether one or more fraction motors are unsuitable in the vehicle system and/or whether the traction motors are mismatched by determining performance relationships of the traction motors (e.g., one or more portions or points of the curves 301, 311) and comparing the determined performance relationships to designated relationships (e.g., expected or known performance relationships). As one example only, embodiments may calculate a linear portion of the curves (described in greater detail below) to determine the slope of the linear portion and compare the calculated slope to expected or known slope values for high-slip and low-slip motors. However, this is only one specific example and it is understood that embodiments are not limited to calculating linear portions of the performance relationships.

Furthermore, it is noted that the curves in FIG. 3 and the curves in other figures are for illustration only. For instance, other embodiments may use different units or may detect different values than those shown in the curves. Moreover, in other embodiments, the relationships between the values may differ. Accordingly, the shapes of the curves in FIG. 3 are provided only as examples.

As shown, each of the curves 301, 311 intersects the horizontal axis at 320, which represents a synchronous speed (or frequency) of the traction motors. Synchronous speed of a fraction motor is equal to a speed of the rotating magnetic field that is generated by the stator. The synchronous speed is dependent upon the excitation frequency of the input current. During a motoring stage of the traction motor, torque is generated by the traction motor to move the axle coupled to the traction motor. The motor speed at the motoring stage is less than the synchronous speed in order to generate the torque. More specifically, when the rotor of the traction motor rotates at a motor speed that is less than the synchronous speed, current is induced within the rotor which generates a force for moving the axle. However, when the rotor rotates at the synchronous speed, the current induced within the rotor is at a minimum and no torque is generated. For example, each of the traction motors generates zero torque at the synchronous speed 320.

When the vehicle system achieves a designated cruising speed (e.g., speed of the vehicle) during a motoring stage, it is generally desirable for the motor speed to be greater than the motor speed that correlates to a maximum torque (also referred to as a breakdown torque). The maximum torque of the low-slip traction motor is indicated at 302, and the maximum torque of the high-slip traction motor is indicated at 312. The motoring stage for the low-slip traction motor is indicated at 303 and, in FIG. 3, correlates to a motor speed between about 59.2 rpms and 61 rpms. The motoring stage for the high-slip traction motor is indicated at 313 and correlates to a motor speed between about 57.2 rpms and 61 rpms. As shown, the motoring stages 303, 313 of the low-slip and high-slip traction motors, respectively, have different ranges of motor speeds.

Also shown, the curves 301, 311 include a generally linear portion in the motoring stages 303, 313. Slopes of the linear portions, however, at the respective motoring stages 303, 313 are different. For example, the curve 301 along the motoring stage 303 is steeper than the curve 311 along the motoring stage 313 (or the curve 311 is shallower than the curve 301). The low-slip traction motor is more sensitive to changes in motor speed in which a small change in motor speed results in a relatively large change in torque. The high-slip traction motor, on the other hand, is less sensitive to changes in motor speed. In the example shown in FIG. 3, when the motor speed reduces from the synchronous speed, the low-slip traction motor increases torque about twice as fast as the high-slip traction motor.

It is noted that various types of fraction motors have similar linear relationships between the torque and the motor speed during the motoring stage. The slopes of the linear portions, however, can be different among different types of traction motors. As such, the slopes of the torque-speed curves during the motoring stages may be used to at least one of determine that the traction motors are different or identify a type of traction motor. For example, during operation of the traction motors in the motoring stages 303, 313, the maximum torques 302, 312 may be identified. The slopes of the linear portions of the curves 301, 311 may be calculated using the synchronous speed 320 as one data point and the maximum torques 302, 312 as other data points. With respect to the embodiment of FIG. 3, the high-slip traction motor may have a constant K for the motoring stage 313 that is equal to −X, and the low-slip traction motor may have a constant K for the motoring stage 303 that is equal to −2X. To determine whether the traction motors are different types, the values of the constant K may be compared to each other or compared to expected values within a database or look-up table.

As noted herein, embodiments are not limited to calculating linear portions of the performance relationships. Instead, embodiments may determine any relationship metric (e.g., point, shape, slope, and the like) of the performance relationship and compare the determined relationship metric to an expected or known metric. The relationship metric and the expected metric may correspond to, for example, designated shapes of a curve, slopes between two points of the corresponding curve, values at a designated point of the curve (e.g., maximum value in the curve), or ranges of values between two points of the curve. In some embodiments, the expected metric may be a threshold value, a baseline value, and the like. If the relationship metric is above a threshold or below a baseline, the traction motor corresponding to the relationship metric may be determined to be unsuitable or mismatched.

Figure 4:
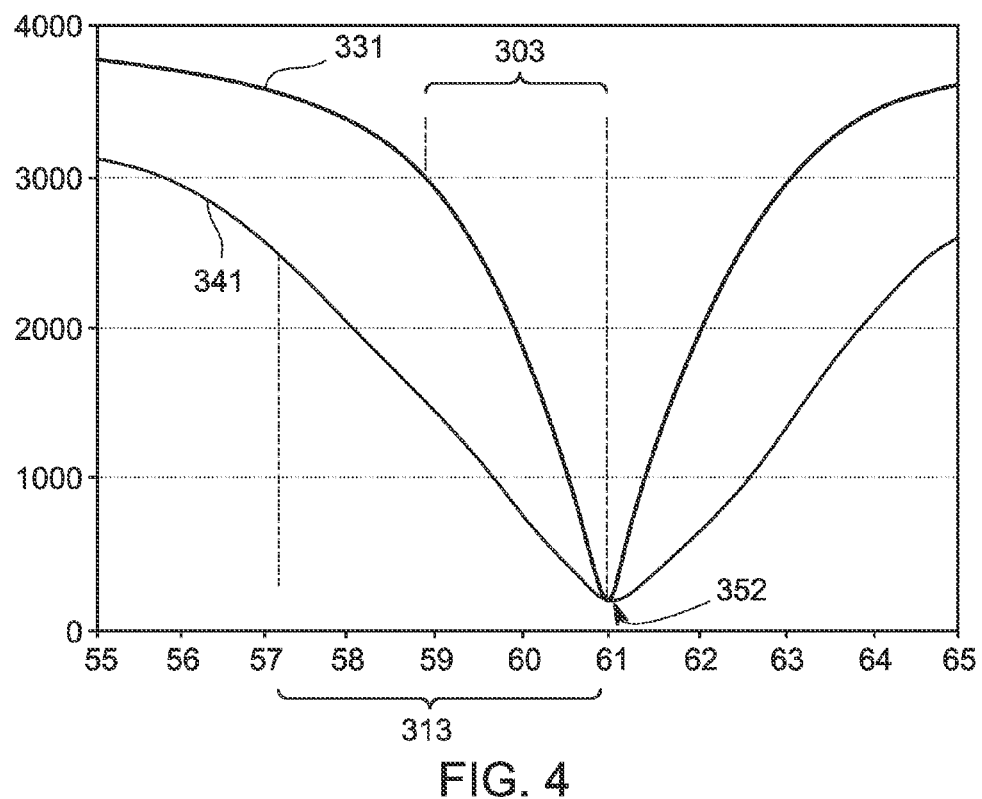
FIG. 4 illustrates current-speed relationships for different types of traction motors in accordance with an embodiment.

FIG. 4 is a plot representing current-speed relationships of the low-slip and high-slip traction motors of FIG. 3. A curve 331 represents the current-speed relationship of a low-slip traction motor, and a curve 341 represents the current-speed relationship of a high-slip traction motor. Similar to the torque of the low-slip and high-slip traction motors, the differences in the curves 331, 341 may be based on differences in the structures and/or compositions of the components of the traction motors.

The current-speed relationships shown in FIG. 4 may also be used to determine that the traction motors are different types. Similar to the curves 301, 311 of FIG. 3, the curves 331, 341 of FIG. 4 have substantially linear portions during the motoring stages 303, 313, respectively. Each of the curves reaches a minimum at 352, which represents an amount of current at the synchronous speed. During operation of the traction motors in the motoring stage, a plurality of data points of the current may be determined. The slopes of the linear portions of the curves 331, 340 may be calculated using the data points along of the curves 331, 340 and the minimum 352 as another data point.

Figure 5:
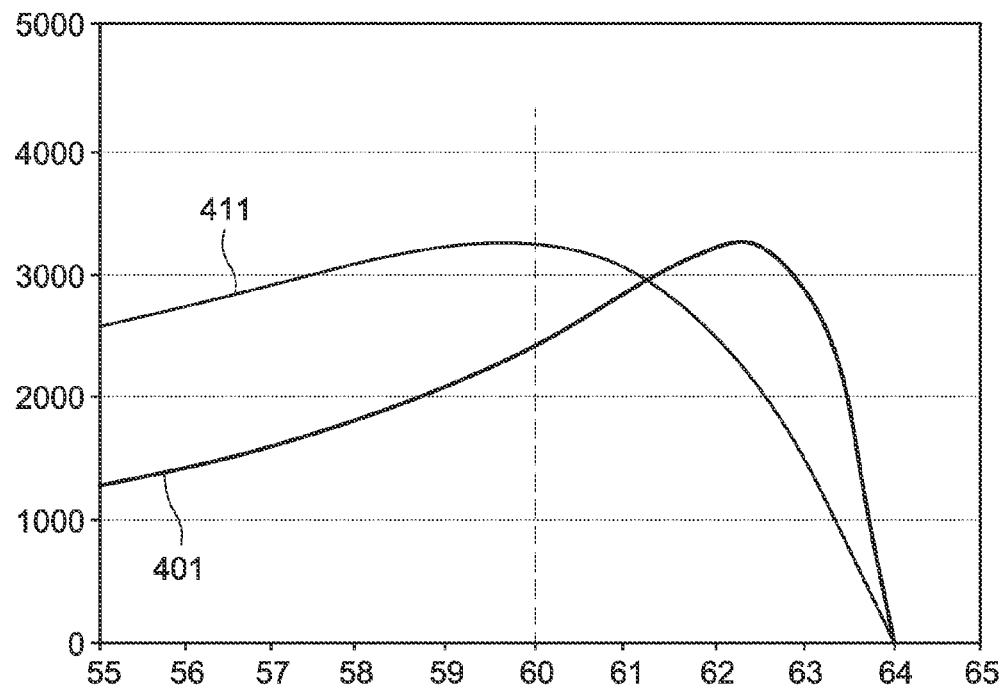
FIG. 5 illustrates torque-speed relationships for different types of traction motors that are controlled by a common inverter in accordance with an embodiment.
Figure 6:
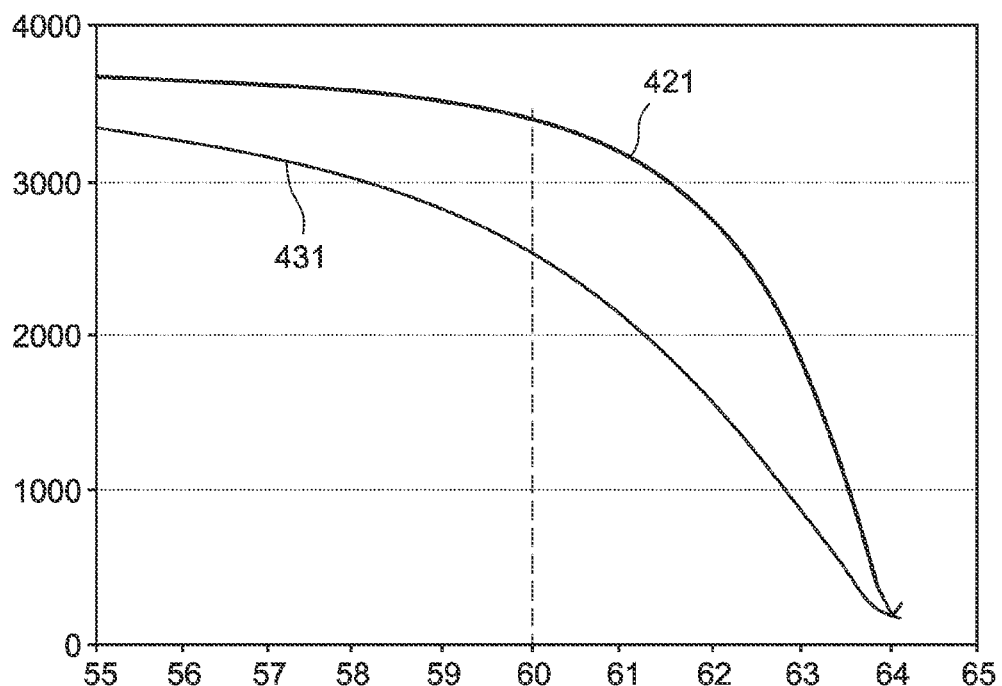
FIG. 6 illustrates current-speed relationships for different types of traction motors that are controlled by a common inverter in accordance with an embodiment.

FIGS. 5 and 6 illustrate performance relationships of three traction motors in which the traction motors are electrically parallel and therefore supplied with the same excitation frequency. The excitation frequency may be supplied by a common inverter. However, in other embodiments, the traction motors may be in series or a combination of traction motors may be in parallel and in series. In such instances, the performance relationships may be different than those shown in the figures.

FIG. 5 shows a plot of the torque-speed relationships, and FIG. 6 shows a plot of the current-speed relationships. With respect to FIG. 5, a curve 401 represents a torque-speed relationship of a low-slip fraction motor. A curve 411 represents identical torque-speed relationships of two high-slip traction motors. Only one curve 411 is shown because the curves of the two high-slip traction motors are overlapping after compensation for operating temperature. With respect to FIG. 6, a curve 421 represents a current-speed relationship of the low-slip fraction motor. A curve 431 represents identical current-speed relationships of the two high-slip traction motors. Again, only one curve 421 is shown because the curves of the two high-slip traction motors are overlapping.

During operation of the vehicle system having the low-slip traction motor and the high-slip traction motors, a vehicle-control module, such as the vehicle-control module 281, may control the inverter to achieve a designated total tractive. For example, the vehicle-control module 281 may adjust an excitation frequency of the inverter until a total tractive effort of 9000 ft-lbs. In FIG. 5, the excitation frequency is 64 Hz. When the motor speed is 60 Hz as shown, the vehicle system may achieve the total tractive effort of 9000 ft-lbs.

However, maintaining the motor speed at 60 Hz may have undesired effects on the low-slip fraction motor. For example, for the embodiment shown in FIGS. 5 and 6, the current of the low-slip traction motor is at 3500 A and the current of the high-slip traction motors is about 2500 A. Thus, for less tractive effort, the low-slip tractive motor draws a significantly larger current than the high-slip tractive effort. For per-truck embodiments, if a first traction motor has a torque measurement that exceeds the torque measurement of a second traction motor, but the current measurement of the first traction motor is less than the current measurement of the second traction motor, then the first traction motor may be designated as not matching the other traction motors or as being an unsuitable type of motor.

Figure 7:
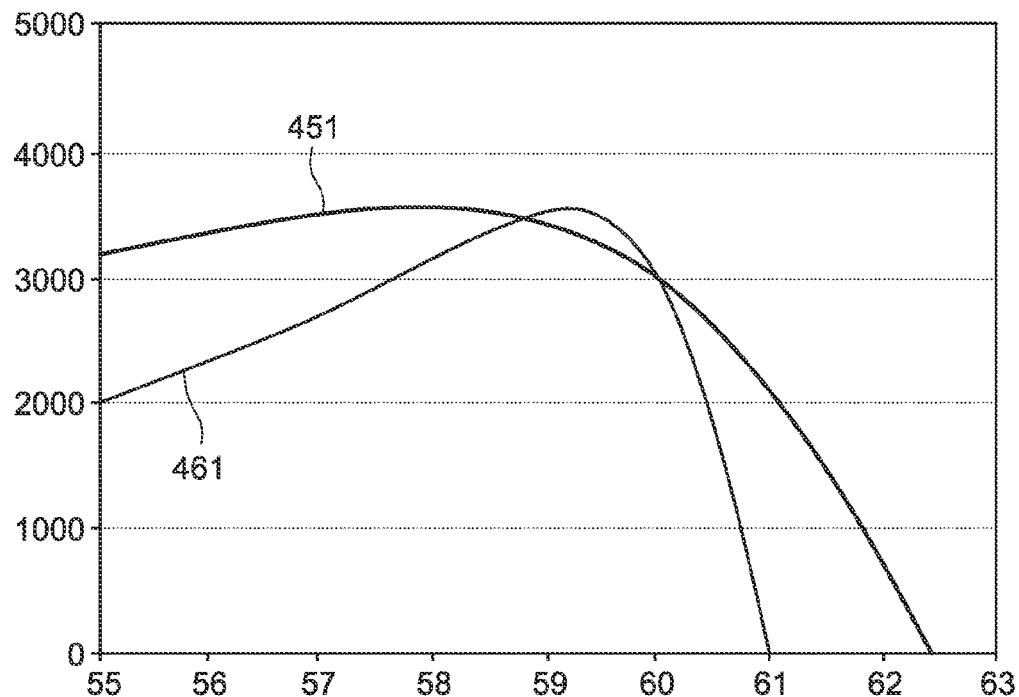
FIG. 7 illustrates torque-speed relationships for different types of traction motors that are individually controlled by separate inverters in accordance with an embodiment.
Figure 8:
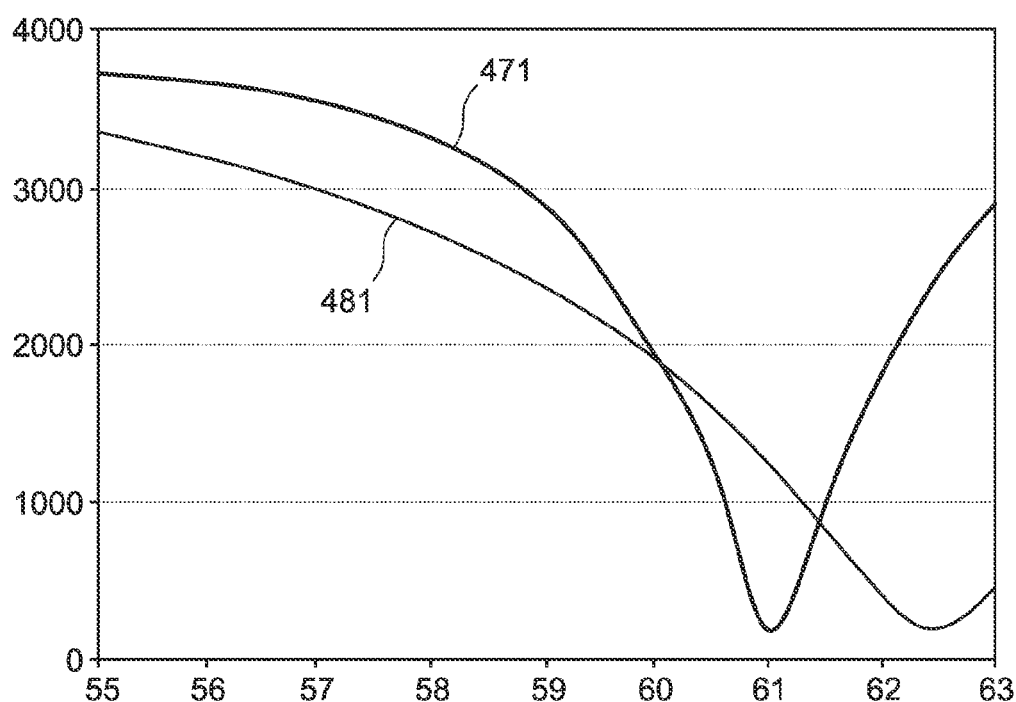
FIG. 8 illustrates current-speed relationships for different types of traction motors that are individually controlled by separate inverters in accordance with an embodiment.

FIGS. 7 and 8 illustrate performance relationships of three traction motors in which the fraction motors are individually controlled by separate inverters. As such, the excitation frequency and, hence, the synchronous speed of the fraction motors may vary. With respect to FIG. 7, a curve 451 represents identical torque-speed relationships of two low-slip traction motors. A curve 461 represents a torque-speed relationship of a high-slip traction motor. With respect to FIG. 8, a curve 471 represents identical torque-speed relationships of two low-slip traction motors. A curve 481 represents a torque-speed relationship of a high-slip traction motor. As shown in FIGS. 7 and 8, the curves 451, 461, 471, and 481 have different features or characteristics. As described below with respect to the method 500 (FIG. 9), these features or characteristics may be used to determine that the low-slip traction motor was incorrectly installed into the vehicle system.

In FIGS. 5-8, the performance relationships of traction motors of the same type (e.g., high-slip or low-slip) have been shown as being represented by identical curves. When one or more embodiments are implemented, however, the performance relationships may not be identical. For example, traction motors that are of the same type (e.g., designed to provide the same motor performance) may have slightly different performance relationships due to tolerances in the manufacturing process of the traction motors or due to operating temperatures of the traction motors. Furthermore, although traction motors may be of the same motor type, two traction motors may have different lifetime experiences and, as such, may have sustained unequal amounts of wear. In addition to the traction motors, the wheels or axles attached to the traction motors may have varying degrees of wear. For example, even if the wheel diameters of two wheels on a common truck differ only slightly (e.g., by 0.5-1.0%), the performance relationships of the two traction motors may be different. Nonetheless, in many cases, the performance relationships may have the same features or characteristics that distinguish one motor type of another. Thus, it is understood with the embodiments described herein that motor types may be differentiated even if the traction motors have different degrees of wear and/or the axles and wheels attached to the traction motors may have different degrees of wear.

In some cases in which the motor types are different or when the traction motors are of the same type but provide different performances due to wear or tolerances in the manufacture of the traction motors, an event may occur in which a first traction motor is braking and a second traction motor is generating power. More specifically, due to the performance differences, the first traction motor may have a positive torque along the performance curve and the second traction motor may have a negative torque along the performance curve such that the second traction motor is generating power (e.g., through dynamic braking) In such instances, the first and traction motors work against each other. Even though each of the first and second traction motors may be effectively providing some effort (e.g., tractive or braking efforts), the overall torque provided by the first and second traction motors may be about zero. During these circumstances, it may be difficult to obtain a desired performance from the first and second traction motors and/or one or more of the traction motors may overheat. In addition to the above, if the fraction motors are of different types, compensation for non-motor characteristics, such as manufacturing tolerances or operational differences (e.g., wheel diameter), may be further compromised, which can also lead to overheating or increased losses.

In some embodiments, the vehicle system may identify the different motor types and control operation of the traction motors to avoid or reduce the number of times the traction motors work against each other. For example, the planning module 284 may generate operating plans that reduce the number of times first and second traction motors work against each other and/or reduce the duration in which the first and second traction motors are working against each other.

Figure 9:
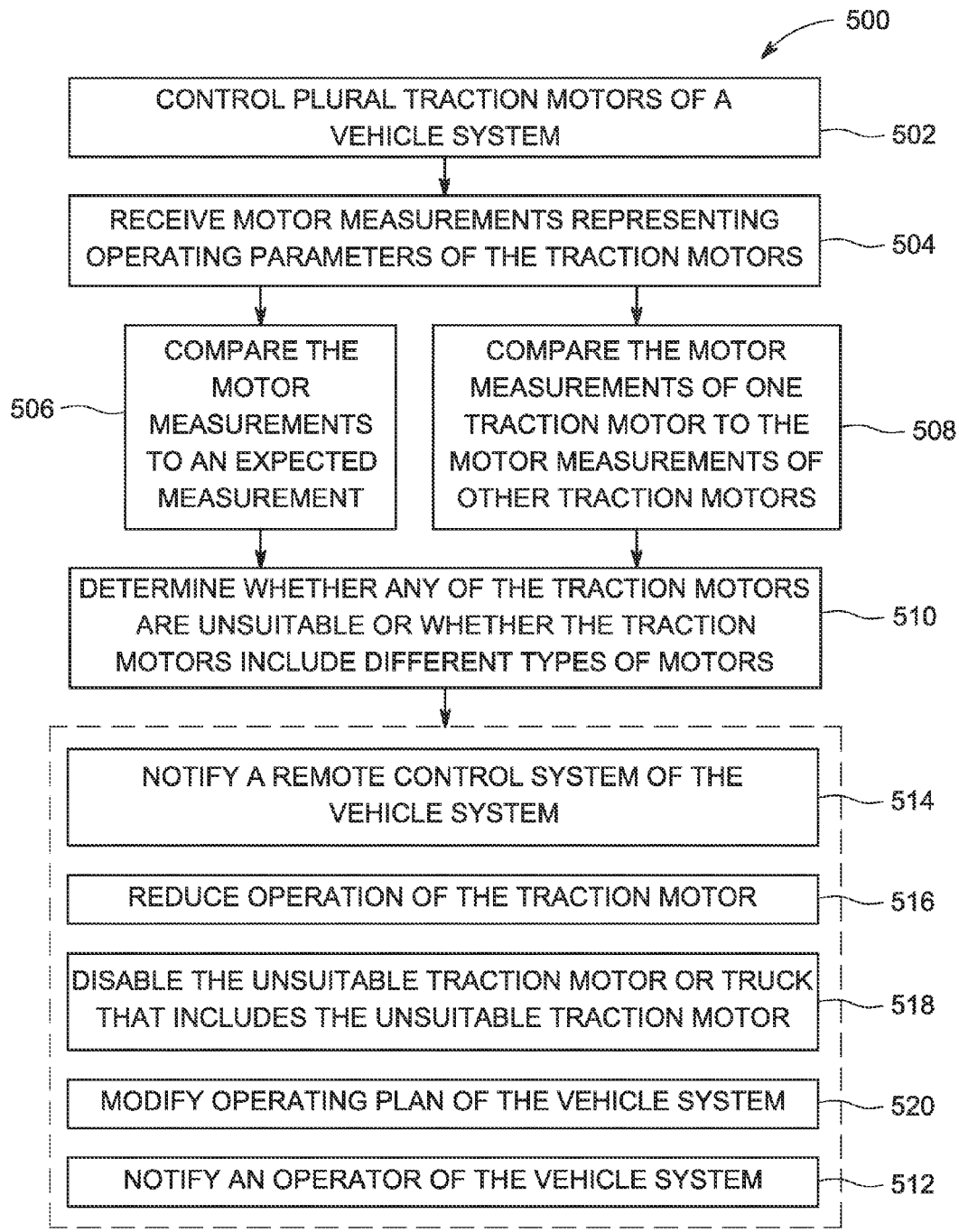
FIG. 9 is a flowchart illustrating a method in accordance with an embodiment.

FIG. 9 is a flow chart illustrating a method 500 in accordance with an embodiment. The method 500, for example, may employ structures or aspects of various embodiments (e.g., systems and/or methods) discussed herein. In various embodiments, certain steps (or operations) may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. The method 500 (or certain steps thereof) may be implemented by one or more algorithms that are executed by logic-based devices to control hardware (e.g., propulsion system, control system, individual modules of the control system) to perform designated operations as described herein.

The method 500 includes controlling (at 502) plural traction motors of a vehicle system to propel the vehicle system along a route. The fraction motors may be part of the same truck, the same propulsion-generating vehicle, or the same vehicle system, which may include multiple propulsion-generating vehicles and, optionally, multiple vehicle consists. In certain embodiments, the propulsion-generating vehicles are per-truck or per-axle vehicles. As used herein, controlling the plural traction motors to propel the vehicle system along a route includes propelling the vehicle system along a major route that is heavily-trafficked or along a route that is not heavily-trafficked, such as tracks by a wayside station. More specifically, the vehicle system may be traveling at relatively slow vehicle speeds (e.g., less than 10 miles per hour (mph) (or 16.1 kilometers per hour (kph)) or relatively fast vehicle speeds (e.g., 50 mph or more (or 80.5 kph or more)) or at a vehicle speed in between. In particular embodiments, at least some of the motor measurements may be acquired when the traction motors are operating at respective motoring stages, such as when the motor speed is between the synchronous speed and a motor speed that corresponds to the maximum possible torque of the traction motor.

At 504, motor measurements may be received that represent operating parameters of the traction motors. In some embodiments, the operating parameters may relate directly to a performance or output of the traction motor, such as torque, horsepower, tractive effort, motor current, motor slip, or motor speed. The operating parameters may also relate directly to one or more inputs that cause the directly effect the performance of the traction motor, such as a supply current, excitation frequency, and supply voltage. Other operating parameters may be monitored as well, such as wheel slip, axle and/or wheel diameters, thermal rise, impedance, reactance, etc.

The motor measurements may be compared (at 506) to an expected measurement. In some embodiments, the comparing (at 506) may be performed by the analysis module 283 (FIG. 2). The expected measurements may correspond to a designated motor type. For instance, the expected measurement may represent the motor measurement that should be received if the motor-of-interest was of the designated motor type. The expected measurement may be a function of the operating conditions that the traction motors are currently operating within. For instance, the expected measurement may be a function of at least one of the excitation frequency, load of the vehicle system, an apportioned load for the motor-of-interest, or other operating parameters. In particular embodiments, the designated motor type is a high-slip motor or a low-slip motor.

By way of example, during a motoring stage of a propulsion-generating vehicle that has a per-truck propulsion system, motor measurements for a traction motor may be received. The motor measurements may include torque measurements when the motor speed and excitation frequency are known. The torque measurements may be compared to expected measurements for low-slip traction motors that are operating at the same motor speed and excitation frequency. If the torque measurements significantly differ from the expected measurement, then the traction motor may be designated as not being suitable for per-truck operation. For example, a motor measurement may significantly differ from an expected measurement if the motor measurement differs by at least a designated percentage of the expected measurement or if a difference between the motor measurement and the expected measurement exceeds a designated value.

The torque measurements may also be compared to expected measurements for other types of traction motors, such as high-slip traction motors. If the torque measurement is approximately equal to the expected measurement, then the traction motor may be designated as a high-slip traction motor. For example, a motor measurement may be approximately equal to an expected measurement if the motor measurement differs by less than a designated percentage of the expected measurement or if a difference between the motor measurement and the expected measurement is less than a designated value.

In some embodiments, the expected measurement may also include a performance relationship. The performance relationship may be a function of multiple operating parameters and may be calculated by the measurement module 282 (FIG. 2). The expected measurement may be an expected performance relationship, such as those shown in FIGS. 3 and 4. The comparing (at 506) may include comparing one or more features or metrics of the performance relationships to determine whether the motor-of-interest is a designated motor type. For example, the slope of the linear portion of the performance relationship may be calculated and compared to an expected slope. If the slopes are significantly different (e.g., differ by a designated percentage or the difference exceeds a predetermined value), the motor-of-interest may be labeled as having a different motor type.

The method 500 may also include comparing (at 508) the motor measurements of one traction motor to the motor measurements of the other traction motors. The traction motors may be part of the same truck, the same propulsion-generating vehicle, or may be from different propulsion-generating vehicles. If the measurement of a motor-of-interest significantly differs from the measurements of the other traction motors (e.g., differs by a designated percentage or the difference exceeds a predetermined value), the motor-of-interest may be labeled as having a different motor type. As one example, a truck of a propulsion-generating vehicle may include first, second, and third traction motors. If the first and third traction motors have torques of 3500 ft-lbs and the second fraction motor has a torque of 2000 ft-lbs, then the second traction motor may be designated as having a different motor type.

As another example, a vehicle system may include first and second traction motors on one propulsion-generating vehicle and third and fourth traction motors on another propulsion-generating vehicle. If the torques of the first, second, and third traction motors are approximately equal, but the torque of the fourth traction motor is significantly different, then the fourth traction motor may be designated as having a different motor type. In this example, because the traction motors are located on different propulsion-generating vehicles and, thus, may be affected by different inputs or external factors, the torques may be processed to provide values that may be compared.

Based on the comparing (at 506 and/or at 508), the method may also include determining (at 510) that one or more traction motors are unsuitable for the desired operation, that one or more fraction motors have a designated motor type, and/or that a group of traction motors are mismatched. A group of traction motors may be mismatched if more than one motor type exists within the group of traction motors. A group of traction motors may also be mismatched if at least one of the traction motors has been determined to be a designated motor type that is not suitable for the desired operation of the vehicle. In some embodiments, traction motors may be mismatched if one or more of the traction motors is not the type of traction motor that was intended to be installed in the vehicle system. For example, operating plans may be generated based on designated traction motors of the vehicle system having designated motor type(s). As a specific example, an operating plan of a vehicle system having two or three traction motors that are electrically parallel and energized by a common source (e.g., inverter) may be based on the two or three traction motors being the same type of traction motor (e.g., high-slip). If one or more of the traction motors is not the designated type of traction motor, the traction motors may be mismatched. In some embodiments, the determining (at 510) may include comparing a motor type that is identified by embodiments set forth herein to the motor type that an operating plan is based on, which may also be referred to as the expected motor type. If the motor types do not match, the traction motors may be designated as being mismatched.

In response to determining (at 510), the method 500 may also include executing one or more subsequent actions. The operator of the vehicle system may be notified (at 512). For example, a user interface in an operator's cab may indicate to the operator that a mismatched traction motor has been identified. The operator may instruct the vehicle system to reduce operation (at 516) of the mismatched traction motor or disable (at 518) the mismatched traction motor. The operator may also communicate a message to a remote dispatch office to initiate a plan for replacing the traction motor. Likewise, a remote control system, such as the control system 116, may be notified (at 514) that the vehicle system is operating with a mismatched traction motor. The control system 116 may instruct the vehicle system to reduce operation (at 516) of the mismatched traction motor or disable (at 518) the mismatched traction motor. The control system 116 may also initiate a plan for replacing the traction motor.

At 520, the control system may automatically request that a modified operating plan be generated. For example, prior to identifying the mismatched traction motor, the vehicle system may be operating in accordance with a designated operating plan. After identifying the mismatched motor, a modified operating plan may be generated. The modified operation plan may at least one of (a) improve an operating efficiency of the vehicle system in light of the mismatched traction motor; (b) reduce the tractive efforts provided by the mismatched traction motor; or (c) disable the mismatched traction motor. For example, the inverter that energizes mismatched traction motors may be selectively controlled to change the excitation frequency or other characteristic that may control performance of the mismatched traction motors. The operating plan may be generated by the planning module 284.

In an embodiment, a control system is provided that includes a measurement module configured to receive motor measurements that represent operating parameters in plural traction motors of a common vehicle system as the vehicle system propels along a route. The fraction motors are energized by a common power source and are electrically parallel with respect to one another. The control system also includes an analysis module that is configured to compare the motor measurements to one another. The analysis module is configured to determine that the traction motors include different motor types and are mismatched based on comparing the motor measurements to one another.

In one aspect, the analysis module is configured to determine that the traction motors include different motor types based on a difference of the motor measurements.

In another aspect, the traction motors are from a common propulsion-generating vehicle. In one aspect, the traction motors are induction motors that are energized by a common inverter.

In another aspect, the analysis module is configured to calculate performance relationships of the operating parameters for the traction motors. The analysis module is configured to determine that the traction motors include different motor types based on a comparison of the performance relationships. In one aspect, the performance relationships include at least one of a torque-slip relationship, a current-slip relationship, a torque-speed relationship, or a current-speed relationship.

In another aspect, in response to determining that the traction motors include different motor types, the control system is configured to at least one of (a) notify an operator of the vehicle system that the fraction motors include different motor types; (b) notify a remote monitoring station that the traction motors include different motor types; (c) reduce tractive efforts of one or more of the traction motors; or (d) instruct a planning module to modify an existing operating plan of the vehicle system based on the fraction motors of the different motor types.

In another aspect, the control system includes a planning module, wherein in response to determining that the traction motors include different motor types, the planning module is configured to modify an existing operating plan to at least one of (a) improve an operating efficiency of the vehicle system; (b) reduce the tractive efforts provided by one or more of the traction motors; or (c) disable one or more of the fraction motors.

In another aspect, the different motor types include a high-slip induction motor and a low-slip induction motor.

In an embodiment, a method is provided that includes controlling plural traction motors of a vehicle system to propel the vehicle system along a route. The traction motors are energized by a common power source and are electrically parallel with respect to one another. The method also includes receiving motor measurements that represent operating parameters of the traction motors as the vehicle system propels along the route and comparing the motor measurements to one another. The method also includes determining whether the traction motors include different motor types and are mismatched.

In one aspect, the traction motors are from a common propulsion-generating vehicle. For example, the traction motors may be induction motors energized by a common inverter.

In another aspect, the method also includes calculating performance relationships of the operating parameters for the traction motors and determining that the traction motors include different motor types based on a comparison of the performance relationships.

In another aspect, in response to determining that the traction motors include different motor types. The method also includes at least one of (a) notifying an operator of the vehicle system that the traction motors include different motor types; (b) notifying a remote monitoring station that the traction motors include different motor types; (c) reducing tractive efforts of one or more of the traction motors; or (d) instructing a planning module to modify an existing operating plan of the vehicle system based on the fraction motors of the different motor types.

In another aspect, in response to determining that the traction motors include different motor types, the method also includes modifying an existing operating plan to at least one of (a) improve an operating efficiency of the vehicle system; (b) reduce the tractive efforts provided by one or more of the traction motors; or (c) disable one or more of the traction motors.

In an embodiment, a control system is provided that includes a measurement module configured to receive motor measurements that represent operating parameters of plural traction motors of a common vehicle system as the vehicle system propels along a route. The fraction motors are energized by a common power source and are electrically parallel with respect to one another. The control system also includes an analysis module that is configured to compare the motor measurements to an expected measurement. The expected measurement corresponds to a designated motor type. The analysis module is configured to determine that at least one of the traction motors is different from the designated motor type based on comparing the motor measurements to the expected measurement.

In another aspect, the operating parameters include at least one of an excitation frequency, a motor speed, a motor current, a voltage, a thermal rise, a torque, or a motor slip of the corresponding fraction motors.

In another aspect, the expected measurement is one of a range of values, a threshold value, or a baseline value.

In another aspect, the expected measurement is a function of an excitation frequency received by the plural traction motors.

In another aspect, the plural fraction motors include at least three traction motors. The analysis module is configured to compare the motor measurements to one another, wherein the analysis module is configured to determine that the at least one traction motor is different based on comparing the motor measurements to one another.

In an embodiment, a control system is provided that includes a measurement module configured to receive motor measurements that represent operating parameters of plural traction motors of a common vehicle system as the vehicle system propels along a route. The traction motors may be energized by a common power source and be electrically parallel with respect to one another. The control system also includes an analysis module configured to compare the motor measurements to an expected measurement. The expected measurement corresponds to a designated motor type. The analysis module is configured to determine that at least one of the traction motors is different from the designated motor type based on comparing the motor measurements to the expected measurement.

In one aspect, the operating parameters include at least one of an excitation frequency, a motor speed, a motor current, a voltage, a thermal rise, a torque, or a motor slip of the corresponding fraction motors.

In another aspect, the expected measurement is one of a range of values, a threshold value, or a baseline value.

In another aspect, the expected measurement is a function of an excitation frequency received by the plural traction motors.

As used herein, the terms "system" and "module" include a hardware and/or software system that operates to perform one or more functions. For example, a module or system may include a computer processor, controller, or other logic-based device that performs operations based on instructions stored on a tangible and non-transitory computer readable storage medium, such as a computer memory. Alternatively, a module or system may include a hard-wired device that performs operations based on hard-wired logic of the device. The modules shown in the attached figures may represent the hardware that operates based on software or hardwired instructions, the software that directs hardware to perform the operations, or a combination thereof.

As used herein, an element or step recited in the singular and proceeded with the word "a" or "an" should be understood as not excluding plural of said elements or steps, unless such exclusion is explicitly stated. Furthermore, references to "one embodiment" or "an embodiment" of the presently described inventive subject matter are not intended to be interpreted as excluding the existence of additional embodiments that also incorporate the recited features. Moreover, unless explicitly stated to the contrary, embodiments "comprising," "comprises," "including," "includes," "having," or "has" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the inventive subject matter, and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, controllers or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

What is claimed is:

1. A method comprising:
    controlling plural traction motors of a vehicle system to propel the vehicle system along a route, the traction motors being energized by a common power source and being electrically parallel with respect to one another;
    receiving motor measurements that represent operating parameters of the traction motors as the vehicle system propels along the route;
    comparing the motor measurements to one another;
    determining whether the traction motors include different motor types and are mismatched; and
    in response to determining that the traction motors include different motor types and are mismatched, at least one of:
        (a) notifying an operator of the vehicle system that the traction motors include the different motor types;
        (b) notifying a remote monitoring station that the traction motors include the different motor types;
        (c) reducing tractive efforts of one or more of the traction motors; or
        (d) instructing a planning module to modify an existing operating plan of the vehicle system based on the traction motors of the different motor types.

2. The method of claim 1, wherein the traction motors are from a common propulsion-generating vehicle.

3. The method of claim 2, wherein the traction motors are induction motors energized by a common inverter.

4. The method of claim 1, further comprising calculating performance relationships of the operating parameters for the traction motors and determining that the traction motors include different motor types based on a comparison of the performance relationships for the different traction motors.

5. The method of claim 4, wherein the performance relationships include at least one of a torque-slip relationship, a current-slip relationship, a torque-speed relationship, or a current-speed relationship.

6. The method of claim 4, wherein the performance relationships of the operating parameters for the traction motors that are calculated are at least one of torque-speed relationships or current-speed relationships, the performance relationships for the different traction motors being compared by comparing slopes of linear portions of at least one of torque-speed curves or current-speed curves during motoring stages of the respective traction motors.

7. The method of claim 1, wherein the received motor measurements represent operating parameters of the traction motors that include at least one of excitation frequency, motor speed, motor current, voltage, thermal rise, torque, or motor slip of the corresponding traction motors.

8. The method of claim 1, wherein the traction motors are determined to include different motor types responsive to the comparison of the motor measurements indicating that the difference between the motor measurements of the traction motors exceeds at least one of a predetermined value or a designated percentage.

9. The method of claim 1, wherein determining whether the traction motors include different motor types includes determining whether each of the traction motors is a high-slip induction motor or a low-slip induction motor.

10. A method comprising:
    controlling plural traction motors of a vehicle system to propel the vehicle system along a route, the traction motors being energized by a common power source and being electrically parallel with respect to one another;
    receiving motor measurements that represent operating parameters of the traction motors as the vehicle system propels along the route;
    comparing the motor measurements to one another;
    determining whether the traction motors include different motor types and are mismatched; and
    in response to determining that the traction motors include different motor types, at least one of
        (a) modifying an existing operating plan to improve an operating efficiency of the vehicle system;
        (b) modifying an existing operating plan to reduce the tractive efforts provided by one or more of the traction motors; or
        (c) modifying an existing operating plan to disable one or more of the traction motors.

11. The method of claim 10, wherein the traction motors are from a common propulsion-generating vehicle.

12. The method of claim 11, wherein the traction motors are induction motors energized by a common inverter.

13. The method of claim 10, further comprising calculating performance relationships of the operating parameters for the traction motors and determining that the traction motors include different motor types based on a comparison of the performance relationships for different traction motors.

14. The method of claim 13, wherein the performance relationships include at least one of a torque-slip relationship, a current-slip relationship, a torque-speed relationship, or a current-speed relationship.

15. The method of claim 13, wherein the performance relationships of the operating parameters for the traction motors that are calculated are at least one of torque-speed relationships or current-speed relationships, the performance relationships for the different traction motors being compared by comparing slopes of linear portions of at least one of torque-speed curves or current-speed curves during motoring stages of the respective traction motors.

16. The method of claim 10, wherein the received motor measurements represent operating parameters of the traction motors that include at least one of excitation frequency, motor speed, motor current, voltage, thermal rise, torque, or motor slip of the corresponding traction motors.

17. The method of claim 10, wherein the traction motors are determined to include different motor types responsive to the comparison of the motor measurements indicating that the difference between the motor measurements of the traction motors exceeds at least one of a predetermined value or a designated percentage.

18. The method of claim 10, wherein determining whether the traction motors include different motor types includes determining whether each of the traction motors is a high-slip induction motor or a low-slip induction motor.

19. A method comprising:
controlling at least three traction motors of a vehicle system to propel the vehicle system along a route;
receiving motor measurements of the traction motors as the vehicle system propels along the route;
comparing the motor measurements to one another;
determining whether one of the traction motors is a mismatched traction motor that includes a different motor type than the other traction motors; and
in response to determining that the traction motors include the mismatched traction motor, at least one of:
  (a) notifying an operator of the vehicle system of an identification of the mismatched traction motor;
  (b) notifying a remote monitoring station of the identification of the mismatched traction motor to initiate a plan for replacing the mismatched traction motor;
  (c) reducing tractive efforts of the mismatched traction motor to a non-zero value; or
  (d) disabling the mismatched traction motor.

20. The method of claim 19, wherein the tractive efforts of the mismatched traction motor are reduced by at least one of reducing an excitation frequency to the mismatched traction motor or intermittently driving the mismatched traction motor.

* * * * *

UNITED STATES PATENT AND TRADEMARK OFFICE
CERTIFICATE OF CORRECTION

Page 1 of 2

PATENT NO. : 9,221,480 B2
APPLICATION NO. : 14/150798
DATED : December 29, 2015
INVENTOR(S) : Daum et al.

It is certified that error appears in the above-identified patent and that said Letters Patent is hereby corrected as shown below:

In the Specification

In Column 1, Line 16, delete "fraction" and insert -- traction --, therefor.

In Column 2, Line 9, delete "fraction" and insert -- traction --, therefor.

In Column 2, Line 12, delete "fraction" and insert -- traction --, therefor.

In Column 3, Line 67, delete "fraction" and insert -- traction --, therefor.

In Column 4, Line 4, delete "fraction" and insert -- traction --, therefor.

In Column 4, Line 16, delete "fraction" and insert -- traction --, therefor.

In Column 5, Line 35, delete "fraction" and insert -- traction --, therefor.

In Column 6, Line 35, delete "fraction" and insert -- traction --, therefor.

In Column 6, Line 36, delete "fraction" and insert -- traction --, therefor.

In Column 7, Line 1, delete "fraction" and insert -- traction --, therefor.

In Column 7, Line 6, delete "fraction" and insert -- traction --, therefor.

In Column 9, Line 29, delete "fraction" and insert -- traction --, therefor.

In Column 9, Line 61, delete "fraction" and insert -- traction --, therefor.

In Column 10, Line 3, delete "fraction" and insert -- traction --, therefor.

In Column 10, Line 25, delete "fraction" and insert -- traction --, therefor.

In Column 12, Line 24, delete "fraction" and insert -- traction --, therefor.

Signed and Sealed this
Nineteenth Day of April, 2016

Michelle K. Lee
*Director of the United States Patent and Trademark Office*

CERTIFICATE OF CORRECTION (continued)
U.S. Pat. No. 9,221,480 B2

In the Specification

In Column 13, Line 36, delete "fraction" and insert -- traction --, therefor.

In Column 13, Line 50, delete "fraction" and insert -- traction --, therefor.

In Column 13, Line 61, delete "fraction" and insert -- traction --, therefor.

In Column 14, Line 18, delete "fraction" and insert -- traction --, therefor.

In Column 14, Line 62, delete "fraction" and insert -- traction --, therefor.

In Column 15, Line 63, delete "fraction" and insert -- traction --, therefor.

In Column 16, Line 2, delete "fraction" and insert -- traction --, therefor.

In Column 16, Line 16, delete "fraction" and insert -- traction --, therefor.

In Column 16, Line 30, delete "fraction" and insert -- traction --, therefor.

In Column 16, Line 32, delete "fraction" and insert -- traction --, therefor.

In Column 17, Line 13, delete "braking)" and insert -- braking). --, therefor.

In Column 17, Line 21, delete "fraction" and insert -- traction --, therefor.

In Column 17, Line 52, delete "fraction" and insert -- traction --, therefor.

In Column 19, Line 20, delete "fraction" and insert -- traction --, therefor.

In Column 19, Line 37, delete "fraction" and insert -- traction --, therefor.

In Column 20, Line 31, delete "fraction" and insert -- traction --, therefor.

In Column 20, Line 58, delete "fraction" and insert -- traction --, therefor.

In Column 20, Line 63, delete "fraction" and insert -- traction --, therefor.

In Column 21, Line 4, delete "fraction" and insert -- traction --, therefor.

In Column 21, Line 36, delete "fraction" and insert -- traction --, therefor.

In Column 21, Line 49, delete "fraction" and insert -- traction --, therefor.

In Column 21, Line 62, delete "fraction" and insert -- traction --, therefor.

In Column 22, Line 1, delete "fraction" and insert -- traction --, therefor.

In Column 22, Line 24, delete "fraction" and insert -- traction --, therefor.